(12) United States Patent
Huard et al.

(10) Patent No.: US 7,466,176 B2
(45) Date of Patent: Dec. 16, 2008

(54) VOLTAGE REGULATOR FOR MICROELECTRONIC DEVICES USING DUAL EDGE PULSE WIDTH MODULATED CONTROL SIGNAL

(75) Inventors: Doug Huard, Portland, OR (US); Robert Greiner, Beaverton, OR (US); Anant Deval, Beaverton, OR (US); Edward Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 11/432,868

(22) Filed: May 12, 2006

(65) Prior Publication Data
US 2007/0262802 A1   Nov. 15, 2007

(51) Int. Cl.
*H03K 3/017*   (2006.01)
(52) U.S. Cl. .................................. 327/172; 327/170
(58) Field of Classification Search ................ None
See application file for complete search history.

(56) References Cited

U.S. PATENT DOCUMENTS

| | | | | |
|---|---|---|---|---|
| 5,818,886 A | * | 10/1998 | Castle | 375/354 |
| 5,949,226 A | * | 9/1999 | Tanaka et al. | 323/285 |
| 6,504,409 B1 | * | 1/2003 | Laletin | 327/175 |
| 6,844,710 B2 | * | 1/2005 | Lipcsei et al. | 323/284 |
| 7,027,944 B2 | | 4/2006 | Tabaian et al. | |
| 7,227,476 B1 | * | 6/2007 | Wong | 341/53 |
| 7,319,312 B2 | * | 1/2008 | Leung et al. | 323/285 |
| 7,336,113 B2 | * | 2/2008 | Laletin | 327/175 |

OTHER PUBLICATIONS

Michael T. Zhang, "Powering Intel Pentium 4 Generation Processors", Platform Technology Operations, Intel Corp., 0-7803-7024—4/01/$10.00(c) 2001 IEEE, 4 pages.
Wenkang Huang, George Schuellein and Danny Clavette, "A Scalable Multiphase Buck Converter With Average Current Share Bus", International Rectifier, Rhode Island IC Design Center, 7 pages.

* cited by examiner

*Primary Examiner*—Tuan Lam
*Assistant Examiner*—Hiep Nguyen
(74) *Attorney, Agent, or Firm*—Blakely, Sokoloff, Taylor & Zafman LLP

(57) ABSTRACT

A voltage regulator is described for microelectronic devices using dual edge pulse width modulated control signal. In one example a first digital duty cycle value is received from a voltage controller and a pulse width modulated waveform is generated in response to the first duty cycle value, the waveform comprising a plurality of pulses with a modulated width. The waveform is applied to a voltage generator to generate a supply of power at a voltage determined by the duty cycle of the waveform. A second digital duty cycle value is received from the controller, and the leading edge of a subsequent pulse of the waveform is advanced if the second digital duty cycle value is greater than the first digital duty cycle. The trailing edge of the subsequent pulse of the waveform is advanced if the second digital duty cycle value is less than the first digital duty cycle value.

20 Claims, 10 Drawing Sheets

VOLTAGE REGULATOR FOR MICROELECTRONIC DEVICES USING DUAL EDGE PULSE WIDTH MODULATED CONTROL SIGNAL

FIELD

The present description relates to the field of voltage regulation for microelectronic devices using digital pulse width modulation and in particular for independently modulation the timing of a leading and a trailing edge of a pulse in a pulse width modulated waveform.

BACKGROUND

Integrated circuits and microelectronic devices use external power supplies to provide the right amount of current and at the proper voltage to drive all of the components that may be inside the device. As the number of components inside a device increases, the amount of power needed increases as well. In addition, as the components inside become smaller, lower voltages are required. This means that the amount of current must be increased to deliver the same amount or more power.

The power delivered to the device generates heat. In order to get the highest performance, the device should have all of the power that it needs, but no extra power since the extra power is converted into unnecessary heat that slows down or may damage the device. High-speed microprocessors, for example, may require a great amount of power, and therefore current, when operating at maximum load. However, the current requirements may change in a small number of clock cycles from very low, when the processor is at idle to very high when the processor is at full load. Quickly changing the power requirements becomes more valuable as different power saving modes are used as Integrated circuits are typically powered from one or more DC supply voltages provided by external supplies and converters, such as a high-efficiency, programmable DC-to-DC (switch-mode) power converter, for example a buck converter, located near the IC package. A buck regulator uses a DC input voltage, e.g. 48 V and provides a DC output, e.g. 2 V. A pulse-width modulation (PWM) controller, drives one or more power transistors, to switch current into filter and decoupling capacitors, and one or more large inductors or transformers. The width of the PWM signal determines the amount of voltage that is sent to the IC. The power is provided through pins, leads, lands, or bumps on the integrated circuit package. The more quickly and precisely the power can be controlled, the more power can be safely delivered, the faster the device will operate, and the less power it will consume in idle or low-power states.

The width of the pulses may be changed by modifying the leading edge of the pulse (leading edge modulation, LEM), modulating the trailing edge of the pulse (trailing edge modulation TEM), or by modifying both the leading edge and the trailing edge of the pulse (dual edge modulation DEM). In some embodiments modulating the leading edge may have a much weaker effect than an equivalent modulation of the trailing edge.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

DETAILED DESCRIPTION

Dual edge modulation may be used in a synchronous buck voltage regulator to improve AC (alternating current) transient response significantly. AC transient response may be defined as the difference between the maximum and minimum voltage when the voltage regulator experiences a maximum step in load current. Independent gain settings for the leading and trailing edges may be used to provide a further improved transient response, resulting in an increased safe operating voltage and increased device speed by more precisely controlling the delivered voltage.

Figure 1:
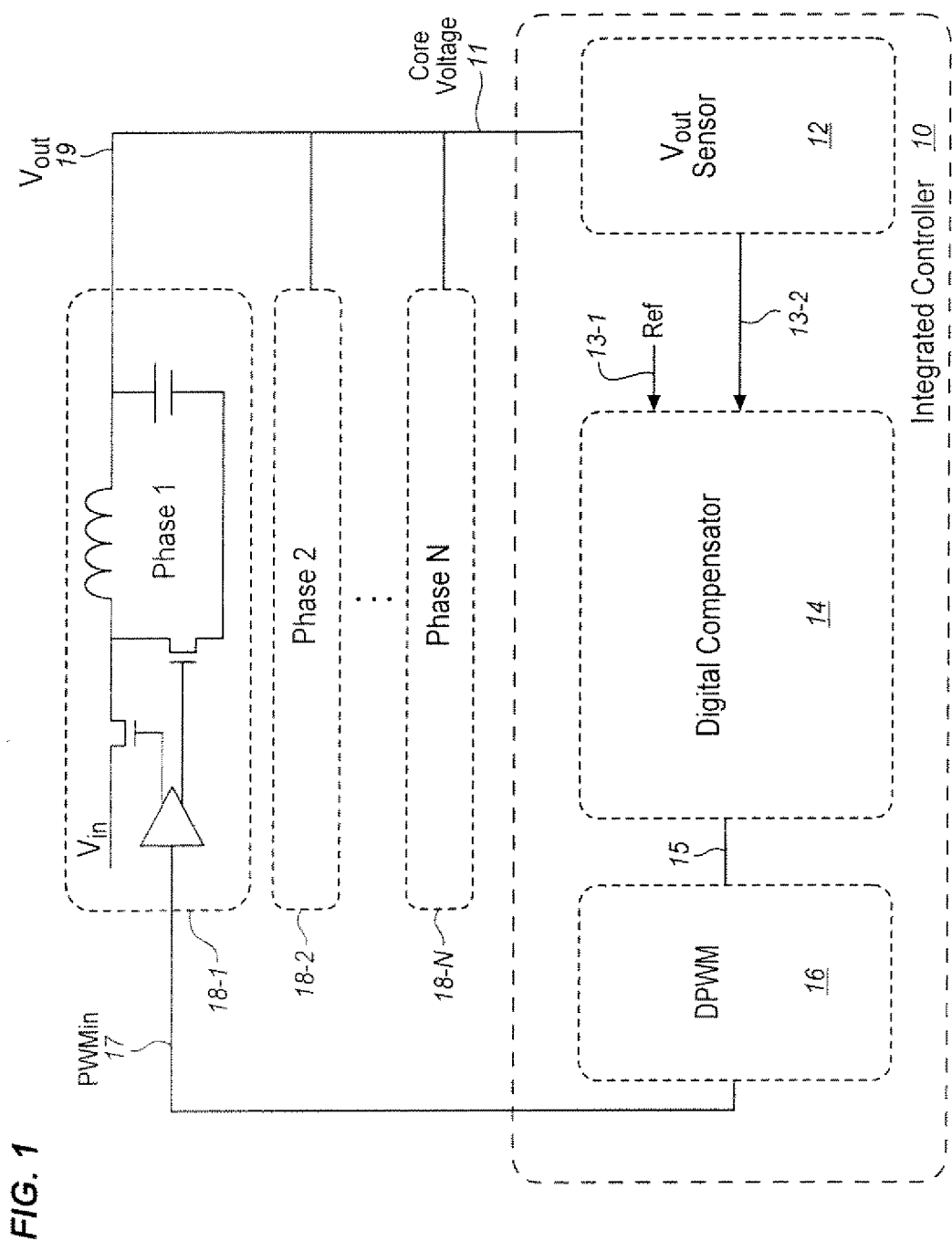
FIG. 1 is a voltage regulator and integrated controller for supplying regulated power to an IC according to an embodiment of the invention.

FIG. 1 shows an example of a power supply, also referred to as a voltage regulator module or a voltage regulator suitable for use with embodiments of the present invention. The power supply may operate using leading edge modulation (LEM), trailing edge modulation (TEM), or dual edge modulation (DEM) as a pulse width modulated control signal. The voltage regulator has a controller 10 that may be integrated on the IC die or provided as separate component.

An array of voltage generator phases or power converters 18-1, 18-2, 18n in this case numbered as n phases each generate a portion of the current needed to achieve a desired voltage $V_{out}$ 19 and the outputs are combined into the output voltage 11. These are identified as different phases because they are normally producing a voltage at different points in time, however, they may all be active or inactive at the same time. In FIG. 1, there are three phases, however the number of phases is not essential to the present invention and one or more phases may be used. The particular number of phases may be adapted to suit a particular application.

The integrated controller includes a voltage sensor 12, a digital compensator 14, and a dual edge digital pulse width modulator 16. The voltage sensor measures the voltage from the phases. In one embodiment, the voltage sensor may be a single detector and analog to digital converter to sense the voltage on the IC at one point at which it is supplied to the IC. In another embodiment, there may be multiple sensors distributed about the surface of the die and the multiple readings are logically combined to derive a single digital voltage measurement output 13-2.

The voltage sensor may also receive other information (not shown) that it may use to adjust the voltage measurement output 13-2. For example if the die gets too hot, the voltage sensor may indicate that the voltage is higher than the measured voltage. This may induce the voltage to be lowered and cool the die. The block may receive any number of other inputs to adjust the output voltage or power from the voltage regulator. Alternatively, these other parameters may be handled in a related or different circuit or component.

The output of the sensor 13-2 is provided to the digital compensator 14, together with a reference signal 13-1. The digital compensator performs multiply and accumulate operations using the inputs to generate a voltage demand output signal 15 that is provided to the modulator 16. The digital compensator 14 effectively compares the measured voltage value to a reference or target value 13-1 and produces the duty cycle value 15. The digital compensator may be a complex microprocessor, a simple logic or application-specific circuit, an input/output hub or a group of such devices. The target voltage may reflect the power needs or anticipated power needs of the IC or portion of the IC for which the signal is generated. The target voltage may also incorporate other parameters such as temperature, anticipated power needs, calibration factors, timer inputs, and any of a variety of other parameters. Using these two inputs, the sensor generates a duty cycle value output 15 that indicates the amount of voltage that the device requires.

The duty cycle value 15 is applied to the digital pulse width modulator 16. The duty cycle value is used by the DPWM as described below to indicate the desired pulse width for the DPWM output or the desired change in the pulse width of the DPWM output. The duty cycle value 15 may take a variety of different forms. In one embodiment, the duty cycle value is a number indicating the desired pulse width of the DPWM output and a new value is provided at regular intervals, with a frequency in the tens of megahertz. In another embodiment, the signal indicates a desired change. The particular features, frequency and values of the signal may be adapted to suit any particular application.

The PWM waveform or waveforms (there may be multiple waveforms, one per phase) 17 generated by the DPWM 16 is received as an input to the switching circuits 18 that then generate the output drive voltage 19. The switching circuit may apply the input to an amplifier, the output of which is coupled to a gate of a switch, such as a MOSFET (metal oxide semiconductor field effect transistor) switch. The source for the switch is coupled to an input voltage and the drain of the switch is coupled to the output 19 through an inductor. The leading edge of the PWM waveform turns on the switch and the trailing edge turns off the switch. The inductor and capacitor(s) evens out the voltage transitions.

The amplifier output is also coupled to the gate of another MOSFET switch that is coupled to at its source to the drain of the first switch before the inductor and at its drain to ground (not shown) and to the voltage output through a capacitor. As a result, the second switch sources current to the inductor through the capacitor from the ground The inductor pulls current through the ground when the switches are off. (This typically happens when the LS switch is on and the HS switch is off)_ The input voltage may be from about 2 to 20V (or any other voltage higher than the desired output voltage) and the output voltage depends upon the duty cycle of the PWM waveform. The greater the duty cycle, the higher the voltage. The output voltage is proportional to the inductance and the rate of change of the current and the particular values for all of the components may be selected to match any particular application. Each of the switching circuits may have the same or different values.

Figure 2:
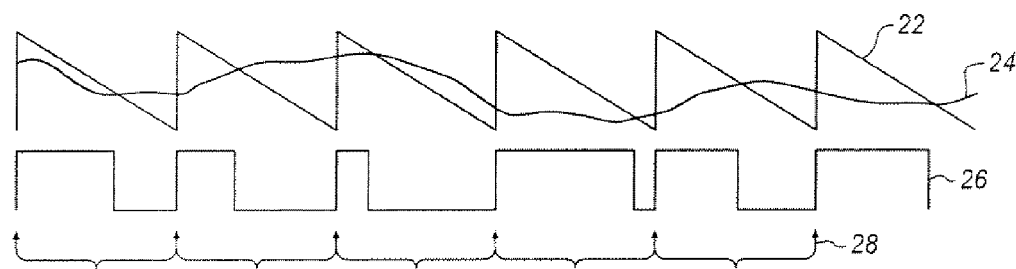
FIG. 2 is a waveform diagram of amplitude versus time showing an analog compensation value applied to a sawtooth waveform for trailing edge pulse width modulation.
Figure 3:
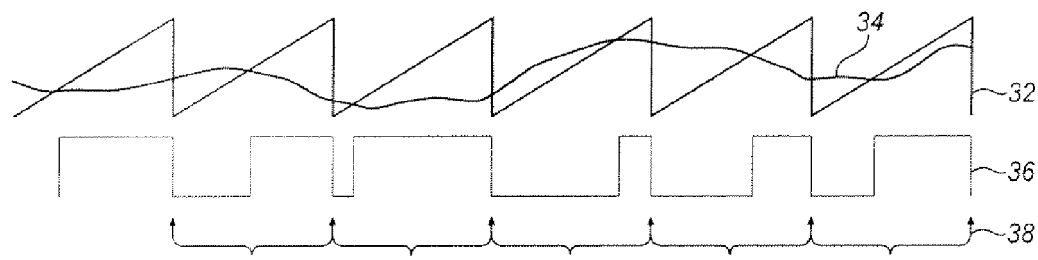
FIG. 3 is a waveform diagram of amplitude versus time showing an analog compensation value applied to a sawtooth waveform for leading edge pulse width modulation.
Figure 4:
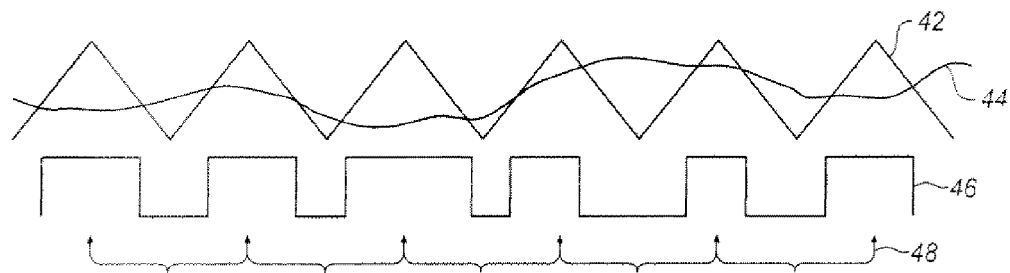
FIG. 4 is a waveform diagram of amplitude versus time showing an analog compensation value applied to a sawtooth waveform for dual edge pulse width modulation.

The digital pulse width modulator and its pulse width modulated output may be understood by reference to a corresponding analog circuit as shown in FIGS. 2, 3, and 4. An analog PWM may combine a compensator output with an appropriate triangular waveform to generate a PWM waveform for the phases.

Trailing-edge pulse width modulation (TEM) may be accomplished in an analog controller by using a sawtooth waveform with a fast rising edge and a ramp falling edge. This is shown in FIG. 2 as the sawtooth waveform 22. The output of a compensator 24 rises and falls and the two curves are combined in a comparator to produce trailing-edge modulated pulses 26 shown in the same timeline. The arrows 28 below the TEM waveform indicate the rising edge for each pulse and show that these occur at fixed points in time. The trailing edges modulate in time, that is, they occur at different points in time, depending on the compensator output waveform.

Leading-edge modulation (LEM) is shown in the diagram of FIG. 3. In FIG. 3, the sawtooth waveform 32 has a ramp rising edge and a fast falling edge. The compensator output 34 is combined with this waveform in a comparator to produce leading-edge modulated pulses 36. The arrows 38 below the LEM waveform 36 are aligned with the trailing edges to show that they occur at fixed points in time while the rising edges modulate in time.

FIG. 4 shows an example of dual-edge modulation (DEM). In this case, in an analog controller, a triangular waveform 42 is used instead of the sawtooth waveform of FIGS. 2 and 3. This waveform has a ramp rising edge and a ramp falling edge. The waveform 42 of FIG. 4 has the same rising and falling rate, however, this may be adjusted to suit any particular application. As the output of the compensator 44 rises and falls, the comparator produces dual-edge modulated pulses 46. The center of the DEM pulses in this example occur at fixed points in time as shown by the arrows 48 below the DEM output. The arrows are not necessarily exactly in the center of each pulse to the extent that the compensator output can change during the pulse as can be seen in the fourth arrow, as an example. The leading and trailing edges both modulate in time. For slowly changing compensator outputs, 50% of the change may be added to the leading edge, and 50% of the change may be added to the trailing edge.

The PWM waveform will be changed by the compensator output when either the output voltage from the connected voltage regulator is too low or too high. When the voltage is too low, then the pulse width is increased to compensate and energy is added to the output filter of the voltage regulator. When the output voltage is too high, then the duty cycle of the PWM waveform may be reduced to compensate.

The fastest way to increase the duty cycle of the PWM waveform is to turn on the next phase sooner (or leave the existing phase on longer, if a phase already happens to be on). This is done with leading edge modulation. Since with TEM a phase may only be turned on at fixed times, the next phase cannot be turned on sooner. There are only fixed times to turn on the phase of the PWM pulse and the duration of the pulse cycle, i.e. the time interval from the start of one pulse to another indicated by the arrows in FIG. 2, is fixed. This fixed pulse cycle may amount to a long delay between when a duty cycle increase is called for and when the PWM waveform can respond.

Conversely, when the output voltage is too high and the energy being added to the output filter needs to be stopped to compensate, the fastest way to do this is to turn off the pulse or shorten the pulse width. This is done with trailing edge modulation. Since the pulse in LEM always ends at the same time as shown in the arrows of FIG. 3, the pulse width in a LEM waveform cannot be changed until the next pulse cycle.

Due to the consistent regular start time, leading edge modulation may be better for controlling undershoots (droops) in the supplied voltage. Similarly due to the consistent regular end time, trailing edge modulation may be better for controlling overshoots in the supplied voltage. By combining these into a dual edge modulation system, the response to both situations may be improved.

If a duty cycle increase in the PWM waveform is called for, it may be done through leading edge modulation, and if a duty cycle decrease in the PWM waveform is called for, it may be done through trailing-edge modulation. When this is done, PWM waveform edges only move earlier in time, or to the left as shown in FIG. 4. As a result, the pulses tend to move slowly to the left.

With a digital pulse width modulator, a variety of different approaches may be used to adjust the leading and trailing edges of the modulated pulse independently of each other. In one approach, the sign of the duty cycle is monitored, or determined to determine which edge to modulate. Duty cycle increases move the PWM leading edge earlier in time, and duty cycle decreases move the PWM trailing edge earlier in time.

In this approach the change in the duty cycle is computed for each new duty cycle sample produced by the digital compensator 14. The next leading edge of the PWM waveform is pulled in or moved to an earlier time for duty cycle increases. This increases the pulse width. The next trailing edge is pulled in, or moved to an earlier time for duty cycle decreases. This decreases the pulse width.

By only moving the edges in one direction, the leading edge for increases and the trailing edge for decreases, there will always be a gap between pulses. This may be desired to protect the voltage supply circuitry 18. If a duty cycle increase is requested after a pulse has already begun, then the only way to widen that pulse is to push out the trailing edge. If the next pulse is to be still wider, then the next pulse will also have a leading edge that will be pulled in. The combination of pushing out the trailing edge of the present pulse and pulling in the leading edge of the next pulse could cause the edges to collide. In an extreme case the two pulses could become one for an effective pulse width of up to 200%. This very wide pulse width might cause the inductor current to be saturated in some implementations, leading to instability in the control loop, among other problems. Waiting until the next leading edge before increasing the duty cycle and then only moving leading edges to increase the duty cycle prevents the collision.

The same approach may also be employed in reverse and still avoid collisions. So, for example, the change in the duty cycle is still computed for each new duty cycle sample produced by the digital compensator 14. For duty cycle increases, however, the next trailing edge of the PWM waveform is pushed out or moved to a later time. This increases the pulse width. Conversely, for duty cycle decreases, the next leading edge is pushed out, or moved to a later time to decrease the pulse width. Such an approach also avoids collisions between leading and trailing edges. However, the pulses will tend to retreat in time rather than advance. This slows the speed of the PWM waveform response to changes in duty cycles. However, a slower response may be desired for some implementations.

Figure 5:
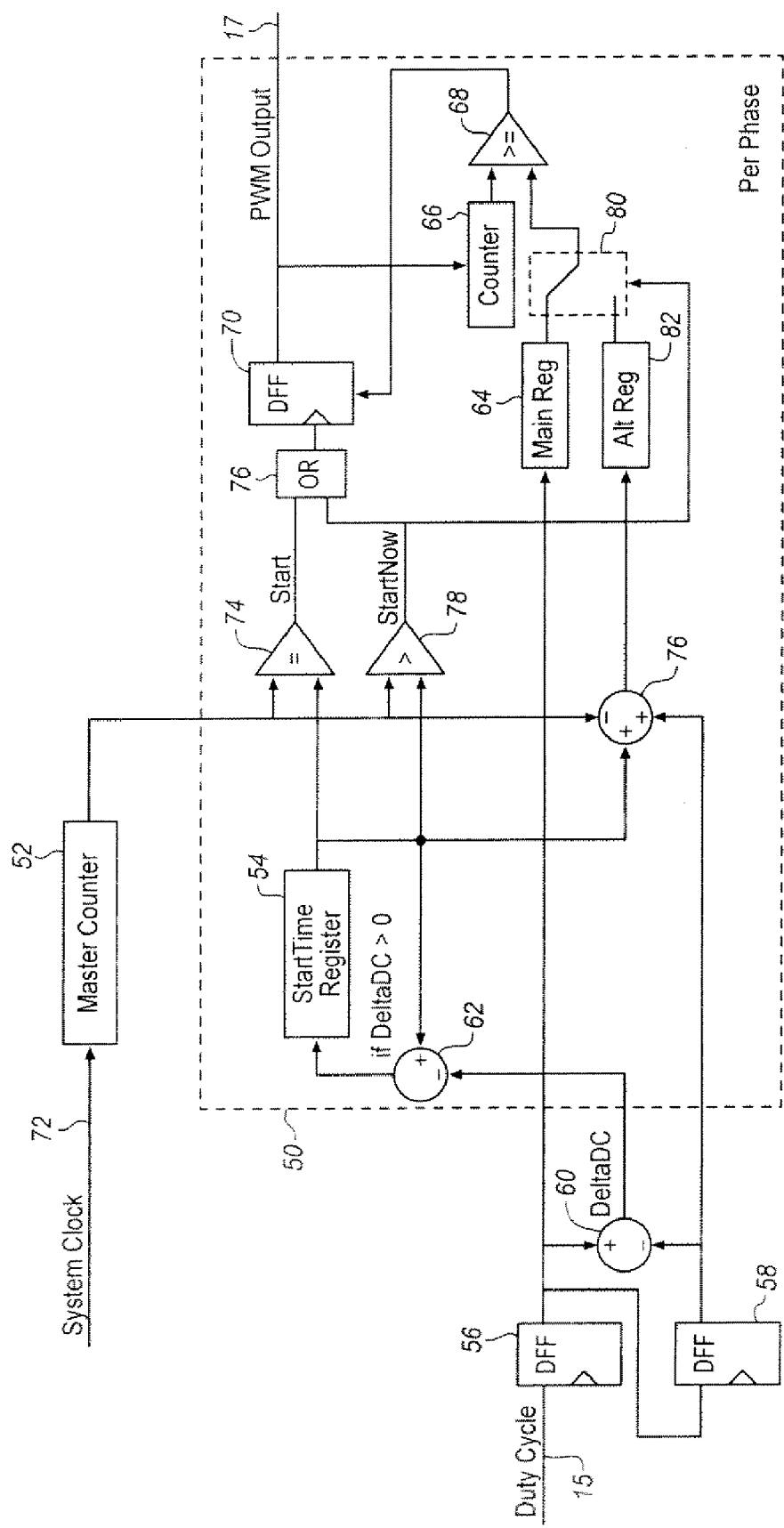
FIG. 5 is a diagram of a digital pulse width modulator according to an embodiment of the invention.

FIG. 5 shows an example DPWM that may be used to implement the first approach in which a duty cycle increase is accomplished by moving the leading edge and a duty cycle decrease is accomplished by moving the trailing edge. In FIG. 5, the duty cycle input 15 is received on the left side of the DPWM 16 and the DPWM generates a PWM output 17 on the right side. A single PWM generator 50 is shown. Such a generator will be present for each of the phases of the voltage generator. In FIG. 1, there are n generators 18-1, 18-2, . . . 18-n. The number of phases 50 is designed so that each generator 18 receives a PWM output. The outputs are typically staggered in phase so that each generator is contributing to the total current at a different time, at least in part. This tends to generate a smoother supply of power 11 to the IC.

In the example of FIG. 5, the duty cycle input 15 is applied to a D flip-flop 56 which saves the value of the duty cycle input until it is updated with the next duty cycle value. The first D flip-flop applies that value then to a second D flip-flop so that the two flip-flops carry the current duty cycle value and the previous duty cycle value. The two values are applied to a subtractor 60 to determine the difference between the two values. This difference is then applied to another subtractor to determine whether the change in the duty cycle is an increase or a decrease. The StartTimeRegister is then updated or not, depending on the result from the subtractor.

To generate the PWM waveform, a start time and a width for the pulse are generated. Both are generated by a third D flip-flop 70 for the pulse. It does so by responding to the start and end times determined by upstream comparators. The start time is determined by the Start or StartNow comparator (74 or 78), and the end time is determined by comparator 68 A system clock 72 is applied to a master counter. The master counter counts up to a selected number and then starts over again. The current value of the master counter is applied to a comparator and when the value of the master counter matches the value of a start time register 54, then an output is asserted through an OR gate 76 to start the pulse from the third D flip-flop 70.

In a multiple phase DPWM, there will be a different start time register for each phase. The start time register values are selected so that each phase and therefore each power generator starts at a different time. If there are five phases, then the master counter might count to 10,000 and each start time register be initiated with a values that are evenly spaced apart, such as 2,000, 4,000, 6,000, 8,000, 10,000. If there were four phases, then the master counter might count to 12,000 and each start time register may be initialized with values of 3,000, 6,000, 9,000, and 12,000.

The selection of values for all of the registers will determine the frequency pulses and may be selected based on the frequency of the input system clock, the electrical characteristics of the connected phases and a variety of other factors. In one embodiment, the input system clock is in Gigahertz, the master counter counts to about 10,000, so that the frequency of the pulses is in hundreds of Kilohertz and the duty cycle is updated in tens of megahertz.

As mentioned above, the difference between the current 56 and previous 58 duty cycle is determined in a first subtractor 60. If the difference is greater than or equal to zero, in other words if the duty cycle is increased, then the difference is subtracted from the start time register value in another subtractor 62. The result is applied as a new start time register value. If the difference in the first subtractor is less than zero because the duty cycle has decreased, then the start time register may not be changed. As a result for a duty cycle increase, the start time register value will be reduced. This will cause the pulse to be started at an earlier master counter 52 value. In other words, the leading edge of the pulse will be pulled in.

In the present example, the duty cycle value is updated around 100 times for each pulse, that is the duty cycle is updated in tens of Megahertz, e.g. 66 MHz and a new pulse is started in 100's of Kilohertz. For a 3.6 GHz clock and a 12,000 count master counter, a pulse will fire in each phase at a rate of 300 KHz. As a result, it can happen that when the value in the start time register is reduced by the subtractor 62, it may be reduced from a value that is more than the the master counter to a value that is less than the master counter. This will prevent a pulse from starting during that cycle of the master counter. As an example, if the start time counter is set to 6,000 and when the master counter is at 5900, the start time counter is reset to 5800, then the master counter will continue to count up, but will not coincide with the start time counter value, until it reaches 12,000 and repeats the count. The comparator 74 will not send an enable until the next cycle.

To accommodate this situation, an additional comparator 78 compares the master counter value to the start time register value. When the master counter value is greater than the start time register value, this comparator sends a start now signal to the OR gate 76. The OR gate will pass this signal to the D flip-flop to start the next pulse. The D-flip flop will not start two pulses if it receives a start from both comparator inputs 74, 78, because after it receives the first pulse, it must be reset before it will start another. The reset comes from the trailing edge which is determined in a separate process.

For the trailing edge, the duty cycle value 58 is applied directly to a main register 64. The duty cycle value in this example is in terms of the number of system clock counts that a pulse should last. In other words, the desired pulse width is expressed in a number of system clock counts. The main register value is applied through a switch 80 to a comparator 68. The other input to the comparator is a counter 66. When the pulse starts on line 17, the counter begins counting. When the count reaches the duty cycle value, then the comparator 68 sends a reset signal to the third D flip-flop which then turns off the pulse. The reset signal defines the trailing edge of the pulse. The trailing edge will accordingly be advanced or delayed if the duty cycle changes at anytime during the pulse. This provides a very fast response to duty cycle value changes during the high stage of the duty cycle of the PWM output. Alternatively, a delay of the trailing edges may be prevented to avoid letting the pulse become wider using additional circuitry (not shown).

Due to the high update frequency of the duty cycle value, the comparator sends a reset signal when the counter reaches the main register value and also if the counter exceeds the main register value. This ensures that if the duty cycle value is reduced to less than the current counter value, the reset signal will be fired immediately. Consider if the main register value is initially 350. When the counter reaches 340, the main register value is reduced to 330. The two values will never be equal, but the comparator will generate the reset signal because the counter value is greater than the main register value.

FIG. 5 also shows an alternate register 82 coupled through the switch 80 to the comparator. The switch is activated by the start now signal from the greater than comparator 78. When the master counter 52 value is greater than start time register 54 value the switch 80 is flipped to connect the alternate register 82 to the trailing edge comparator 68.

An additional subtractor 76 adds the current start time register 54 value to the previous duty cycle value 58 and subtracts the master counter value. This is the value in the alternate register 82. In effect, the alternate register advances the trailing edge by the advance of the leading edge. This prevents changes in the start time register from inappropriately changing the duty cycle through unintended movements of the trailing edge.

Figure 6:
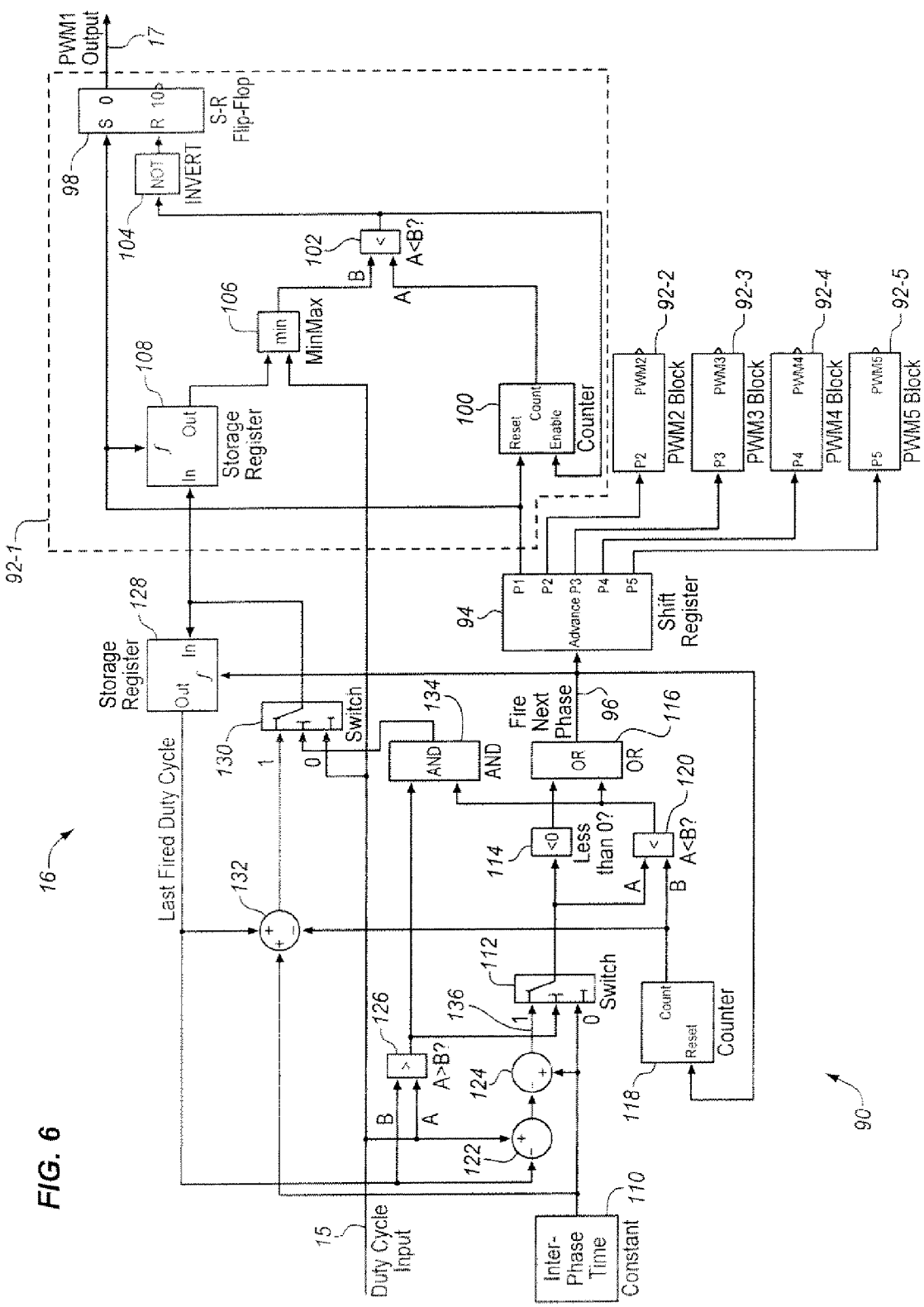
FIG. 6 is a diagram of a second digital pulse width modulator according to another embodiment of the invention.

This approach may have some noise sensitivity in some implementations. The second approach reduces that noise sensitivity. A DPWM for implementing the second approach is shown in FIG. 6. In the example of FIG. 6, there is a global timing block 90 and a timing block 92 for each of five phases 92-1, 92-2, 92-3, 92-4, 92-5. While five phases are shown, as mentioned above, any number of phases may be used depending upon the needs of the IC and the design of the phases. The timing block for each phase may be similar to the one shown. The global timing block generates a FireNextPhase (called FireNextPhase) signal 96 that is applied to a shift register 94. The shift register applies the FireNextPhase signal to each phase in turn to activate the corresponding phase timing block. The shift register may simple cycle through the phase in order, or it may use a more complex process to determine which phase to activate with each FireNextPhase signal.

The pulses are generated by a set-reset flip-flop 98 that is coupled to the PWM output 17. When the FireNextPhase signal is asserted to the phase timing block 92, it is asserted directly to the pulse driver flip-flop 98 to start the pulse. The assertion of the FireNextPhase signal accordingly starts the pulse's leading edge. The FireNextPhase signal is also applied to a counter 100 to determine the trailing edge. The counter is reset and delivers a count to a comparator 102. When the count exceeds the other input to the comparator, then the counter asserts a high output, reversed to a low output in an inverter 104 that then is applied to the reset pin of the pulse output block of the flip-flop. This turns off the pulse, initiating the trailing edge.

As in the previous example of FIG. 5, the trailing edge comes when the counter value is equal to the duty cycle value. The duty cycle value is provided to logic block 106 that selects the lowest of the duty cycle value or a value in a connected register 108. The selected minimum of these two is the second input to the comparator 102.

The timing for the FireNextPhase signal and the value in the connected register 108 are determined by the global timing block. The global timing block is regulated by an inter-phase time value stored in an input register 110. The inter-phase time reflects the number of counts between the firing of each phase. Using the numbers from the example of FIG. 5, the inter-phase time may be 2,000 or 3,000 for a complete power cycle of 12,000 clock cycle counts. The appropriate value for the inter-phase time constant may be selected to suit any particular application.

The inter-phase time register is coupled through a switch 112 to a comparator 114 and an OR gate 116 to the fire next phase line 96. When the fire next phase signal 96 is asserted, it also clears a counter 118 in the global timing block. The counter then begins to count from zero (or one) at the clock rate. A comparator 120 compares the counter value to the inter-phase constant. When the counter value exceeds the inter-phase constant, then an output is asserted to the OR gate 116 and the OR gate generates the FireNextPhase signal. As mentioned above, without any change in the duty cycle, the .FireNextPhase signal will cause a leading edge to be generated in one of the phases each time the inter-phase time is reached.

The duty cycle input value 15 is applied to a variety of components to adjust the positions of the leading and trailing edges when the duty cycle value changes. Changes in the duty cycle are tracked through a few registers. The duty cycle is applied through a switch 130 to the inputs of two storage registers. The first register is the connected register 108 for the minimum selector 106 that initiates the trailing edge of the output pulse. This register captures the duty cycle value when the FireNextPhase signal is asserted to the output block. Accordingly, to determine the position of the trailing edge, the minimum selection block 106 in the phase timing block, will compare the counter value 100 to the lowest of either the current duty cycle value or the duty cycle value when the leading edge started. If the duty cycle value increases, then the trailing edge will not move. If the duty cycle has decreased, then the trailing edge will be pulled in.

The second register128 is in the global timing block. The value of the second register is taken when the fire next phase signal 96 is asserted. Accordingly, there will be a new value in the register 128 for the start of each pulse in each phase. The difference between this value and the current duty cycle value is determined in a subtractor 122 and the difference is then subtracted from the inter-phase time 110 in another subtractor 124. This value is applied to the switch 112 that as a modified inter-phase time 136.

The modified inter-phase time 136 reflects the time between phases reduced by any change in the duty cycle. This allows the leading edge to be advanced. A comparator 126 determines whether the stored duty cycle at the start of the pulse is greater or lesser than the current duty cycle. If the current duty cycle has increased, then the switch 112 is operated to apply the modified inter-phase time to the leading edge counter 118 instead of the inter-phase time from the register. This will result in the fire next phase signal 96 being advanced.

If the change in the duty cycle is greater than the inter-phase time, then the modified inter-phase time will be less than zero. This corresponds to the pulse width being changed by more than the inter-phase time and if applied correctly would cause the leading edge to be advanced so far as to come before the trailing edge of the previous pulse. This condition may be allowed. The "<0" comparator checks to see if the interphase time is less than zero. In such a case, when the inter-phase time is less than zero, it will also be less than the counter value, no matter what the counter value is, so the comparator 120 would also fire. To prevent this from occurring a comparator 114 checks for this condition. When this condition occurs it immediately asserts a high signal to the OR gate 116 that generates the fire next phase signal 96. That causes the next pulse in the next phase to be fired delivering the most amount of duty cycle possible in least amount of time.

As mentioned above the global control storage register 128 will normally contain the duty cycle value that occurred when the pulse in the current phase was fired. This provides a previous duty cycle value to compare with the current duty cycle to determine whether to advance the leading edge. There is another possible input to this register, however.

Another subtractor 132 adds the current value of the register 128 to the inter-phase time 110 and subtracts from that the output of the leading edge counter 118. This number constitutes a modified duty cycle that will be applied to the register when the input switch 130 is activated. It is also applied to the phase control blocks duty cycle register 108 to pull in the trailing edge.

The input switch 130 is activated when the current duty cycle is greater than the previous duty cycle in the register 128 as determined by a comparator, and at the same time, the leading edge counter value 118 has exceeded the inter-phase time 110 or the modified inter-phase time.

Consider an example in which the inter-phase register is set to 3000 and the input duty cycle 15 is 2000 and this is stored in the global control storage register 128. If the duty cycle now changes to 2100, then A is greater than B at comparator 126 and the duty cycle switch 130 will switch to the modified duty cycle input from the subtractor 132. The difference between the two at the duty cycle subtractor 122 will be 2100−2000=100. The next subtractor 124 will arrive at 3000−100=2900. The modified inter-phase time is now decreased to 2900 as compared to the inter-phase time, so the leading edge of the next pulse will be advanced.

At the modified duty cycle subtractor 132, 2000+3000−2900=2100 so that the duty cycle is increased from 2000 to 2100. This means that the trailing edge will stay in the same place. The leading edge is advanced by 100 and the duty cycle is increased by 100. The pulse will be 100 longer, but the trailing edge will come at the same time.

While for the most part, the system of FIG. 6 operates in the same way as the system of FIG. 5, it can be seen that if the duty cycle input 15 changes (and then changes back) before the global counter 118 reaches either the duty cycle or the modified duty cycle count, then there will be no change to the pulse. This resolves a source of noise that may occur in some circumstances.

The system of FIG. 6 constantly computes the position of the leading edge, but does not commit to that position until the leading edge is actually fired by the fire next phase signal 96. In other words, a duty cycle increase ahead of a leading edge will move the leading edge in, and a following duty cycle decrease will move the leading edge back out. Only when the leading edge is pulled into the present time is it asserted. By contrast, in the example of FIG. 5, the leading edge position is pulled in in response to a duty cycle increase, and then the trailing edge is pulled in in response to a duty cycle decrease. This moves the entire pulse earlier in time. There is therefore a drift in the center of the pulses as the duty cycle changes in between pulses. This may not be desired for some voltage generator circuit designs.

Figure 7:
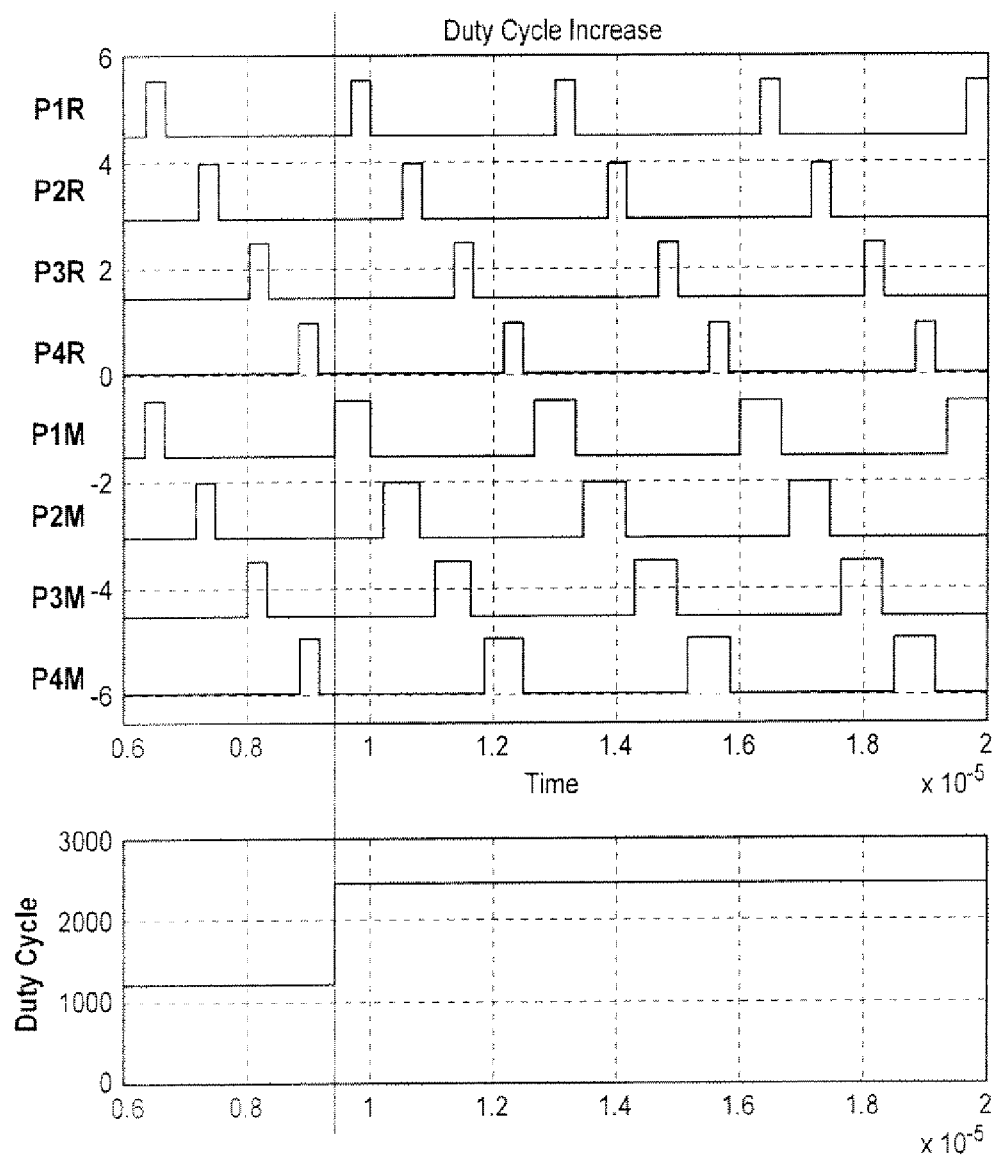
FIG. 7 is a waveform diagram of amplitude versus time showing pulse width modulation in response to a duty cycle command change that advances the leading edge of a pulse according to an embodiment of the invention.

FIG. 7 shows the operation of the systems of FIGS. 5 and 6 when the duty cycle input is increased. FIG. 7 shows a first set of four phase PWM outputs. These are identified as P1R, P2R, P3R and P4R and represent the PWM outputs for phases one to four, respectively, if there had been no change to the duty cycle. P1M, P2M, P3M and P4M represent the PWM outputs for the same four phases when there is a change in response to a change in the duty cycle. As shown in FIG. 7 at about time 9.4, the duty cycle value increases from 1200 to 2400. The leading edge of phase 1 (P1M) is immediately advanced to increase its duty cycle as compared to the phase shown in P1R.

The leading edge at P1M was fired almost immediately which is the maximum increase that can be made to the duty cycle without moving the trailing edge. With the next pulse, which occurs in phase 2 (P2M), the duty cycle is extended still more to achieve the entire 2400 count duty cycle. The resulting modified pulse all show the greater duty cycle. Since in FIG. 7, the duty cycle does not change again, the pulse width does not change either.

Figure 8:
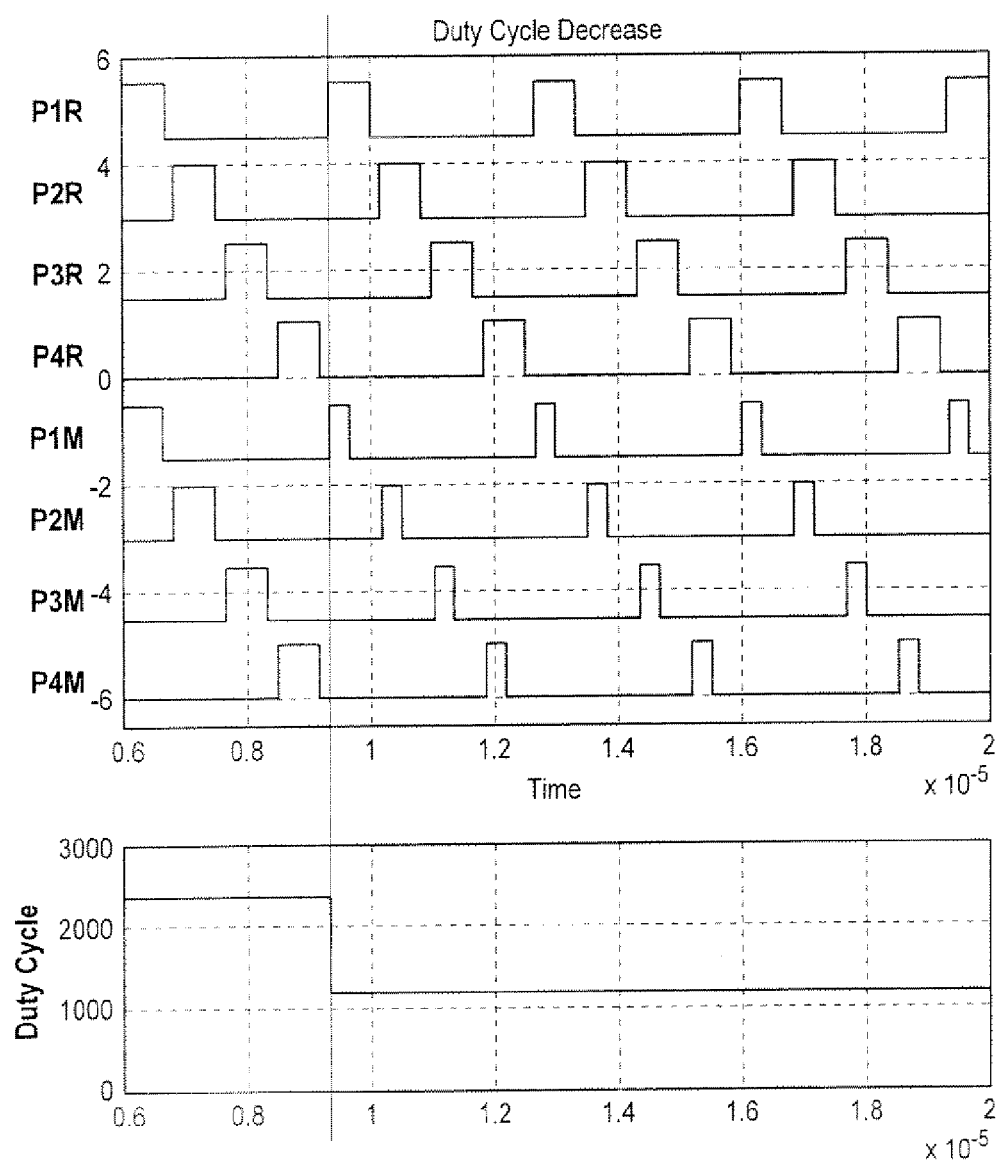
FIG. 8 is a waveform diagram of amplitude versus time showing pulse width modulation in response to a duty cycle command change that advances the trailing edge of a pulse according to an embodiment of the invention.

FIG. 8 is similar to FIG. 7 except that instead the duty cycle is decreased at about time 9.4 from 2400 to 1200. The pulse at phase 1 (P1M) was already fired and so it has been shortened as much as allowed by pulling in the trailing edge. The following pulses all show a similar reduction, since the duty cycle does not change again. In the example of FIG. 7, the response to the duty cycle change was almost immediate, while in the example of FIG. 8, the response to the duty cycle change did not occur until the trailing edge of the current pulse.

An even longer delay, not shown in FIGS. 7 and 8 may occur if a pulse is presently high when a duty cycle increase is requested. The present pulse cannot be widened, so the increase must wait until the next pulse. In the next pulse the leading edge can be pulled in. However, this is a much longer delay than for the example of FIG. 8. The responsiveness of the DPWM accordingly depends on when the change in duty cycle is requested.

In a third approach, either edge of the PWM signal may be modulated in either direction. The time at which a change in the duty cycle is received is used to determine which edge to modulate. This allows an immediate response to be generated for both an increase and a decrease in the duty cycle.

Figure 9:
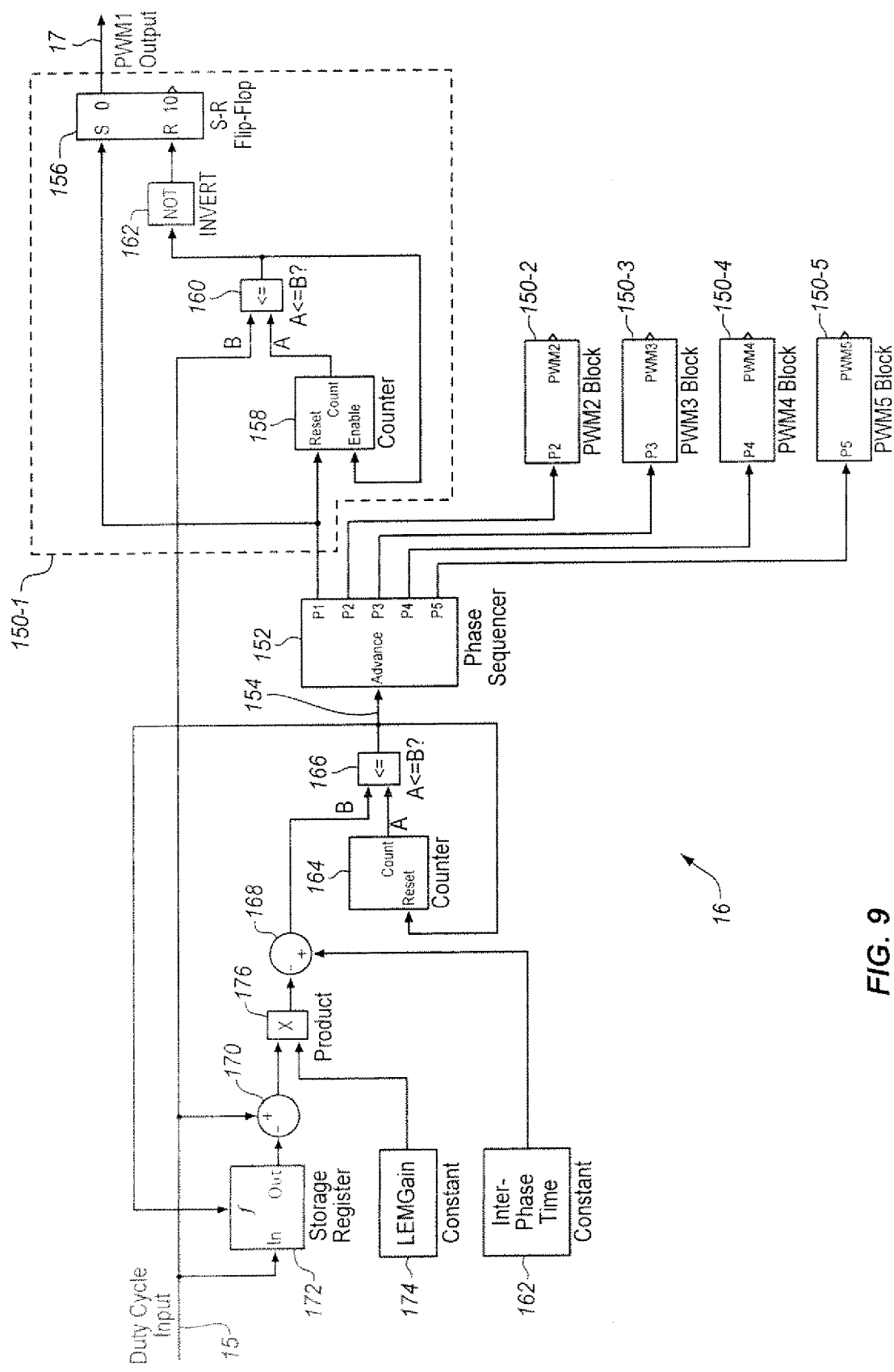
FIG. 9 is a diagram of a third digital pulse width modulator according to a third embodiment of the invention.

In FIG. 9, a phase control block 150 is provided for each phase of the DPWM 16. In the illustrated example there are five identical phase control blocks 150-1, 150-2, 150-3, 150-4, and 150-5 that each produce a PWM output signal 17 for application to a respective voltage generator as described above. The number of phase control block may be modified to suit any particular application. The phase control block is activated by a FireNextPhase signal 154 applied to a shift register or phase sequencer 152 which asserts the FireNextPhase signal to the appropriate one of the five phase control blocks.

The FireNextPhase signal is applied to the set input of an S-R flip-flop 156 that assets the leading edge of the next pulse as a result. The FireNextPhase signal is also applied to the reset input of a trailing edge counter 158. The counter applies its count at the clock cycle frequency to a comparator 160. The comparator compares the count to the current duty cycle input 15 and when the count reaches or exceeds the duty cycle fires its output. This is applied through an inverter to the R input of the S-R flip-flop to stop the pulse, that is to generate the trailing edge. It is also applied to reset the counter.

The trailing edge in this example will be pulled in or pushed out based on the current value of the duty cycle counter. If the duty cycle is significantly reduced during a pulse, then the comparator will immediately cause the trailing edge. While this may not be enough to match the complete reduction, it is the most that can be done, if a pulse is already high. At the same time any changes in between pulses or during an early part of a pulse will not affect the pulse. This reduces the system's sensitivity to small changes.

The position of the leading edge, similar to the example of FIG. 6 is determined in the global control block. The leading edge of the pulse is determined using an inter-phase time taken from a settable register 162 as in FIG. 6. A counter 164 is reset by FireNextPhase signal 154 and then begins to count at the clock cycle speed. The count is applied to a comparator and when it reaches or exceeds the other input, then the FireNextPhase signal 154 is asserted.

The comparator's other input is taken from a modified inter-phase value. If the duty cycle has not changed, then the counter is compared to the inter-phase value and the leading edge will occur at a regular interval as determined by the inter-phase time value.

Each time the FireNextPhase signal is asserted, a register 172 will capture the current duty cycle value. In the example above, the duty cycle may be changed 100 times or more faster than the pulses are fired. As the duty cycle changes and the counter 164 counts, the current duty cycle will be compared to the stored duty cycle in a subtractor 170. The difference will be subtracted from the inter-phase value in another subtractor 168 and this modified inter-phase value is the value that is provided to the comparator 166 that fires the FireNextPhase signal.

As a result, if the duty cycle has increased, then the modified inter-phase value supplied to the comparator will be reduced and the pulse will fire sooner. On the other hand, if the duty cycle has decreased, then the modified inter-phase value will increase and the pulse will fire later. The effect of this may be increased by applying a gain factor 174 to the difference between the current and last fired duty cycle in a multiplier 176. While the gain factor will increase the response to changes for purposes of moving the leading edge. It will not change the width of the pulse because of the counter 158 in the phase control block.

In the example of FIG. 9, both the leading edge and the trailing edge may be moved in either direction and independently of each other in response to the current value of the duty cycle input. This provides a quick response in a wide range of circumstances. There is some risk of leading and trailing edges colliding and this can be accommodated in a variety of different ways. In one example, the phase sequencer may select a phase for which there will be no collision. In another example, the range of movement of the edges may be constrained to avoid such a collision. In another example, the voltage generator electronics may be modified to operate even with a 100% duty cycle.

As a result, if the duty cycle has increased, then the modified inter-phase value supplied to the comparator will be reduced and the pulse will fire sooner. On the other hand, if the duty cycle has decreased, then the modified inter-phase value will increase and the pulse will fire later. The effect of this may be increased by applying the gain factor 174 to the difference between the current duty cycle and duty cycle for the last fired pulse in a multiplier 176. The gain factor will increase the amount of movement of the leading edge that occurs in response to changes in the duty cycle. However, the gain factor will not change the width of the pulse because of the counter 158 in the phase control block. Thus, gain factor 174 and multiplier 176 implement a gain function that is specific only to the leading edge. In some embodiments modulating the leading edge may have a much smaller current step than an equivalent modulation of the trailing edge. In other words, when the PWM output wave is applied to a phase, the change in the current supplied to the IC will be greater for changes in the leading edge of a pulse in the PWM waveform, than for changes in the trailing edge of a pulse of the PWM waveform. The leading edge gain function provided by the gain factor 174 and the multiplier 176 provides a way to correct for this unequal current response. For some applications a leading edge gain factor a power of two (for example an eightfold gain) provides good results. The multiplier 176 may be implemented using a simple shift function.

Figure 10:
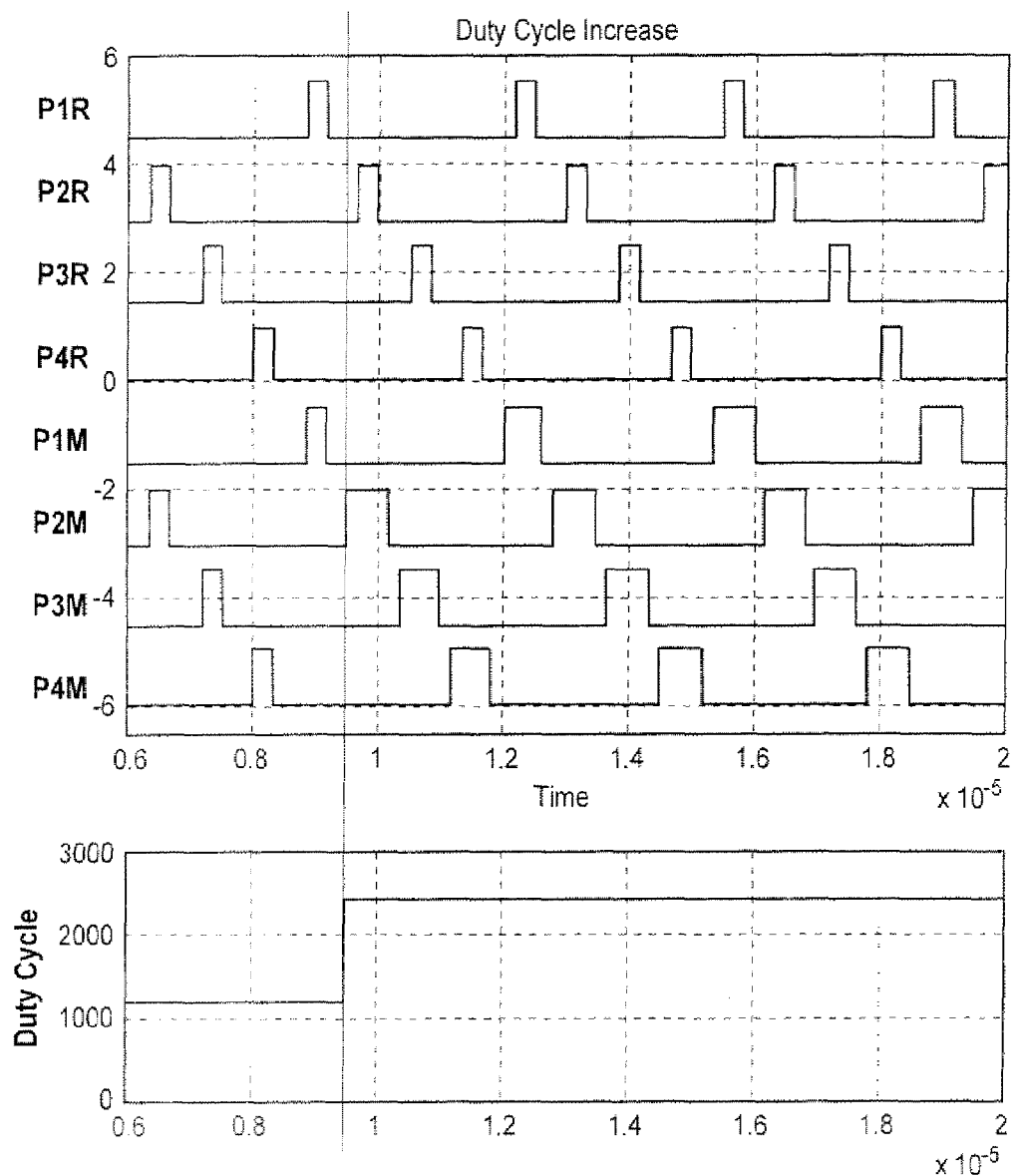
FIG. 10 is a waveform diagram of amplitude versus time showing pulse width modulation in response to a duty cycle command change that advances the leading edge and delays the trailing edge of a pulse according to an embodiment of the invention.

FIG. 10 shows an example of pulse width modulated waveforms generated by the system of FIG. 9. The format of the figures is similar to that of FIGS. 7 and 8. In the example of FIG. 10, the duty cycle input was doubled from 1200 to 2400 at a time of about 9.4. This was after the P1 pulse so the P2 pulse (P2M) was widened from 1200 clocks to 2400 clocks.

It was widened by first pulling the leading edge in as much as possible, and then pushing out the trailing edge for the remainder of the widening. In other words, after the start of the pulse the trailing edge counter pushed out the trailing edge until the count reached 2400. Subsequent pulses were then timed off the leading edge of the first widened pulse. As shown in FIG. 10, all of the modified pulses are wider and they are centered about the same position as the reference pulses.

Figure 11:
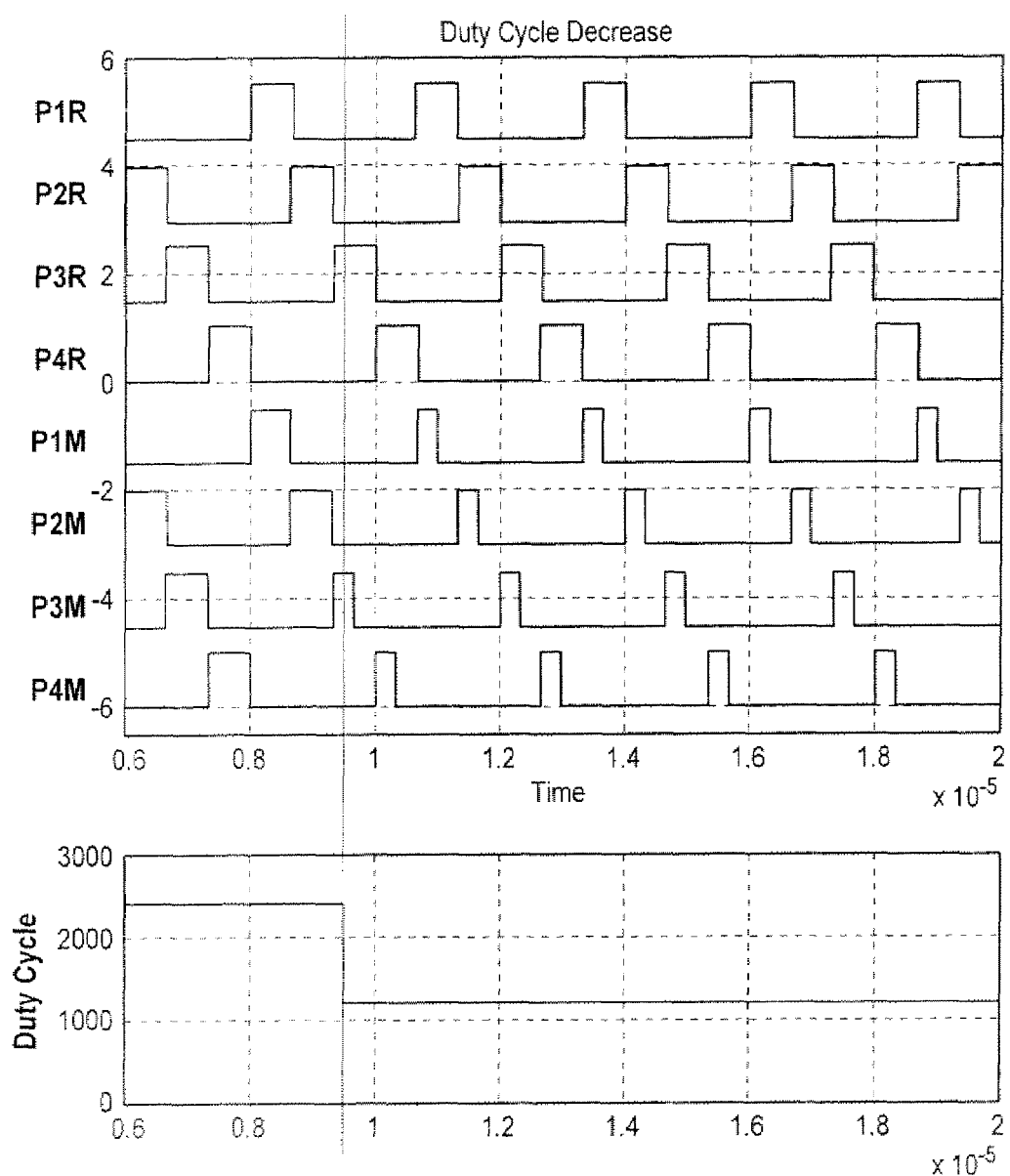
FIG. 11 is a waveform diagram of amplitude versus time showing pulse width modulation in response to a duty cycle command change that advances the trailing edge of a pulse according to an embodiment of the invention.

FIG. 11 shows the operation of the third system when the duty cycle is cut in half at about time 9.4. As shown in the diagram, the P3 pulse (P3M) is being shortened from 2400 clocks to 1200 clocks. The change in duty cycle occurred after the P3 pulse was asserted, so the leading edge was unaffected but the trailing edge counter had not yet reached 1200 clocks. As a result, the pulse was shortened to 1200 clocks. The pulses that follow all show the same shortening but are evenly distributed about the same centerlines as the reference pulses.

Figure 12:
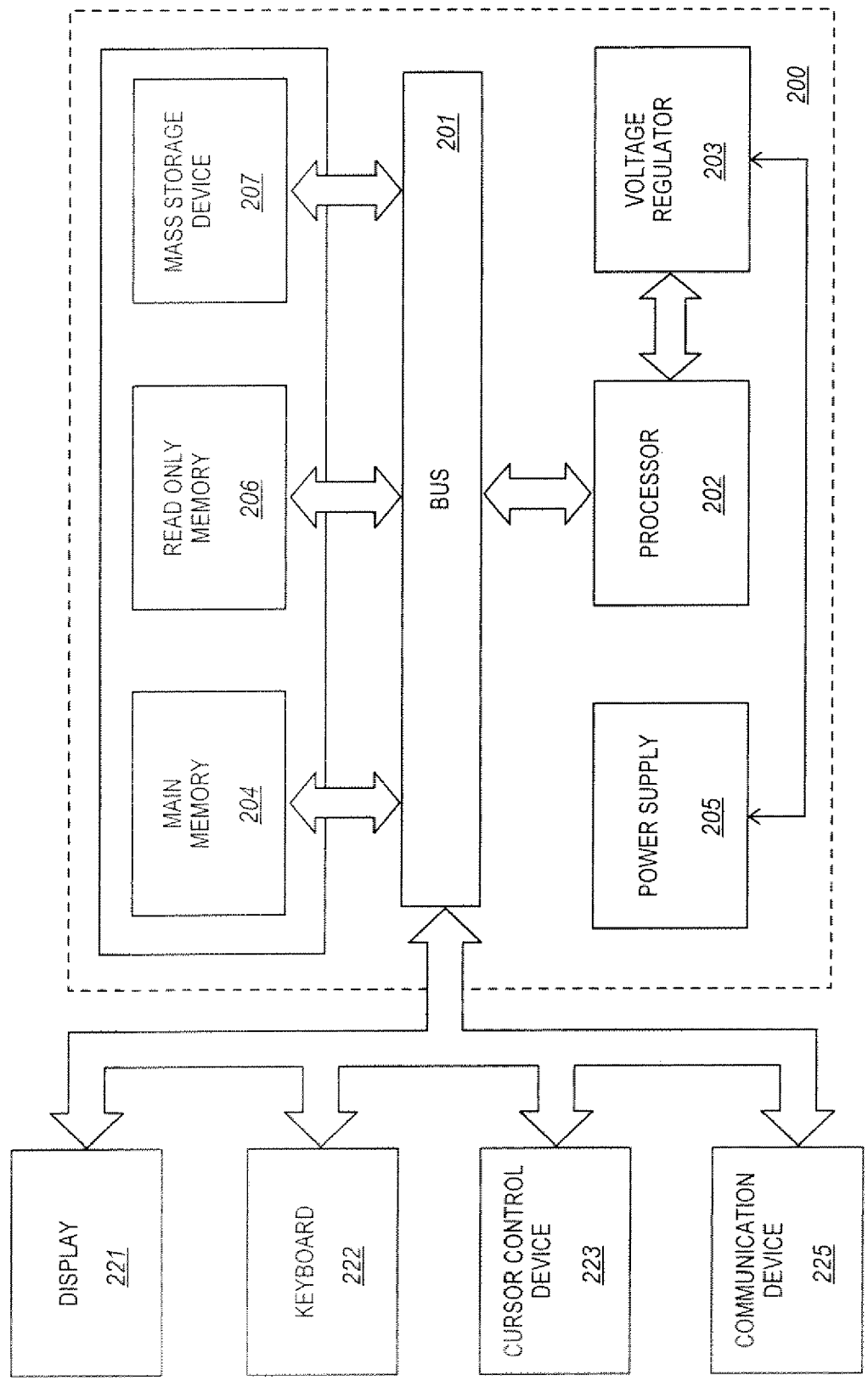
FIG. 12 is a block diagram of a computer system suitable for use with voltage regulator and integrated controller of FIG. 1 and other described hardware.

A computer system 200 representing an example of a system upon which features of the present invention may be implemented is shown in FIG. 12. The IC, the voltage regulator and the other equipment described above may be operated on this architecture. The computer system 200 includes a bus or other communication means 201 for communicating information, and a processing means such as a microprocessor 202 coupled with the bus 201 for processing information. The microprocessor is coupled to a voltage regulator 203 to send the PWMin signal 17 and receive a Vout signal 19. The integrated controller 10 of FIG. 1 is a part of the microprocessor and is not shown separately. A power supply 205 provides power to the voltage regulator from which the Vout input to the microprocessor may be generated. As mentioned above, the integrated controller may be integrated on the microprocessor as shown or provided as separate component or integrated with the voltage regulator. Similarly, the voltage regulator may be provided as a separate component, as shown, or integrated with the microprocessor.

The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions.

The computer system can also be coupled via the bus to a display device or monitor 221, such as a Liquid Crystal Display (LCD), for displaying information to a user. For example, graphical and textual indications of installation status, operations status and other information may be presented to the user on the display device. Typically, an alphanumeric input device 222, such as a keyboard with alphanumeric, function and other keys, may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

A lesser or more equipped computer system than the example described above may be preferred for certain implementations. Therefore, the configuration of the exemplary computer system 100 will vary from implementation to implementation depending upon numerous factors, such as price constraints, performance requirements, technological improvements, or other circumstances. In addition, the voltage regulator may be coupled to other components, in addition to or instead of the microprocessor.

A lesser or more complicated pulse width modulator, integrated controller, voltage regulator and control loop may be used than those shown and described herein. Therefore, the configurations may vary from implementation to implementation depending upon numerous factors, such as price constraints, performance requirements, technological improvements, or other circumstances. Embodiments of the invention may also be applied to other types of systems that use sensor, power supply and control loop systems than those shown and described herein.

Embodiments of the present invention may be provided as a microcode, firmware, embedded instructions, or a computer program product which may include a machine-readable medium having stored thereon instructions which may be used to program a general purpose processor, embedded processor or application specific device (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:

receiving a first digital duty cycle value from a voltage controller;

generating a pulse width modulated waveform in response to the first duty cycle value, the waveform comprising a plurality of pulses with a modulated width;

applying the waveform to a voltage generator to generate a supply of power at a voltage determined by the duty cycle of the waveform;

receiving a second digital duty cycle value from the controller;

advancing the leading edge of a subsequent pulse of the waveform when the second digital duty cycle value is greater than the first digital duty cycle; and advancing the trailing edge of the subsequent pulse of the waveform when the second digital duty cycle value is less than the first digital duty cycle value.

2. The method of claim 1, further comprising:

delaying the trailing edge of a current pulse of the waveform when the second digital duty cycle value is received during the current pulse and the second digital duty cycle is greater than the first digital duty cycle.

3. The method of claim 1, further comprising:

delaying the leading edge of a subsequent pulse of a subsequent pulse of the waveform when the second digital duty cycle value is less than the first digital duty cycle and the second digital duty cycle is received before the start of the subsequent pulse.

4. The method of claim 1, wherein advancing the leading edge of a subsequent pulse of the waveform comprises triggering the leading edge upon receipt of the second digital duty cycle.

5. An apparatus comprising:

a leading edge counter to determine a start time of a pulse of a pulse width modulated waveform, the waveform being applied to a digital voltage generator to supply power to an integrated circuit;

a comparator to advance the start time determined by the leading edge counter in the event of an increase in a duty cycle command; and a trailing edge counter to determine an end time of a pulse of the pulse width modulated waveform based on the duty cycle command.

6. The apparatus of claim 5, further comprising a subtractor to decrease the count of the trailing edge counter to compensate for the advance in the start time from the comparator.

7. The apparatus of claim 5, further comprising a switch to modify the count of the trailing edge counter when the duty cycle command changes after the start of the pulse of the pulse width modulated waveform.

8. The apparatus of claim 5, further comprising a subtractor to compare a new duty cycle command to a previous duty cycle command and a comparator to advance the start time of the pulse of the pulse width modulated waveform when the duty cycle command is increased and to maintain the start time when the duty cycle is decreased.

9. The apparatus of claim 5, wherein the leading edge counter comprises a master counter, a start time register, and a comparator, the master counter being compared in the comparator to the start time register to determine a regular start time for the leading edge of a sequence of pulses.

10. A computer system comprising:

a power supply;

a voltage regulator coupled to the power supply to receive a direct current voltage and to generate a regulated voltage from the received voltage;

a microprocessor to receive the regulated voltage to power the microprocessor, the microprocessor having an integrated controller to sense the voltage of the regulated voltage, to generate a compensation signal in response to the sensed voltage and to generate a digital pulse width modulated waveform in a digital pulse width modulator to apply to the voltage regulator to adjust the regulated voltage, the pulse width modulated waveform being generated using a leading edge counter to determine a start time of a pulse of the pulse width modulated waveform, a comparator to advance the start time determined by the counter in the event of an increase in compensation signal, and a trailing edge counter to determine an end time of a pulse based on the compensation signal.

11. The system of claim 10, wherein the voltage regulator comprises a plurality of phases each to independently generate a regulated voltage to apply to the microprocessor and wherein the digital pulse width modulator comprises a plurality of trailing edge counters to independently produce a pulse width modulated waveform for each of the voltage regulator phases based on the compensation signal.

12. The system of claim 10, wherein the digital pulse width modulator further comprises a register to store a copy of the compensation signal at the leading edge of a pulse and a comparator to compare the compensation signal after the leading edge of the pulse and to advance the trailing edge of the pulse when the compensation signal is reduced.

13. The system of claim 10, wherein the digital pulse width modulator further comprises a subtractor to compare a current compensation signal to a previous compensation signal and a comparator to advance the leading edge of the pulse when the compensation signal is increased.

14. The method of claim 1, wherein generating pulse width modulated waveform comprises starting each pulse of the waveform using a system clock counter and wherein advancing the leading edge comprises starting a subsequent pulse at an earlier count of the system clock counter.

15. The method of claim 14, wherein advancing the trailing edge comprises counting a number of system clock from the leading edge of the subsequent pulse and stopping the pulse after a smaller number of system clocks than the previous pulse.

16. The method of claim 1, wherein receiving a digital duty cycle value comprises receiving the digital duty cycle value from a digital compensator that compares a measured actual voltage value to a target voltage value, the target voltage value being based on estimate future needs of a powered circuit.

17. The method of claim 1, further comprising determining an advance for the trailing edge of a subsequent pulse during a current pulse and delaying the application of the determination until after the leading edge of the subsequent pulse.

18. The apparatus of claim 5, wherein the leading edge counter and the trailing edge counter are coupled to a system clock of the apparatus to count system clock pulses.

19. The apparatus of claim 5, further comprising a switch coupled to the leading edge counter to switch a pulse on and coupled to the trailing edge counter to switch the pulse off.

20. The apparatus of claim 19, wherein the switch is a D-type flip-flop.

* * * * *